T. J. CONKLIN.
COFFEE MILL.
APPLICATION FILED FEB. 6, 1917.
1,248,458.
Patented Dec. 4, 1917.
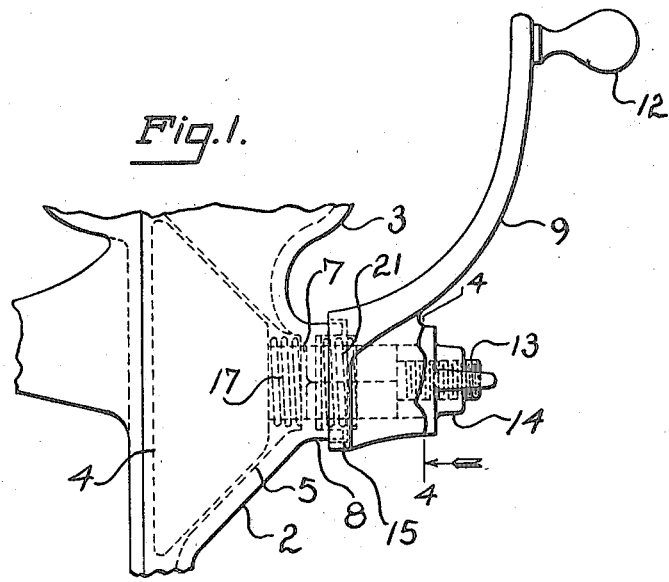
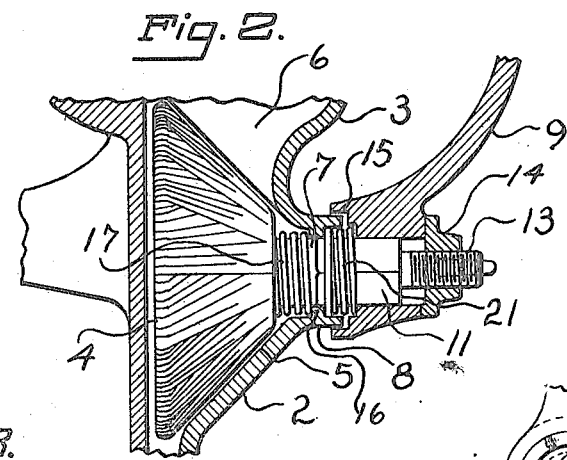
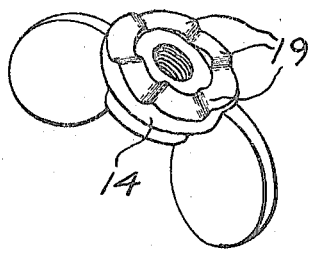
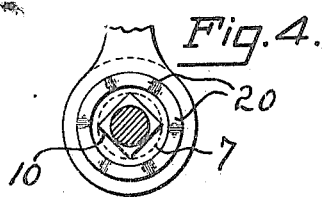
Inventor
Thomas J. Conklin
By Heith Sutherland
Attorney

UNITED STATES PATENT OFFICE.

THOMAS J. CONKLIN, OF MERIDEN, CONNECTICUT, ASSIGNOR TO THE CHARLES PARKER COMPANY, OF MERIDEN, CONNECTICUT, A CORPORATION OF CONNECTICUT.

COFFEE-MILL.

1,248,458.

Specification of Letters Patent.

Patented Dec. 4, 1917.

Application filed February 6, 1917. Serial No. 146,876.

*To all whom it may concern:*

Be it known that I, THOMAS J. CONKLIN, a citizen of the United States, residing at Meriden, in the county of New Haven and State of Connecticut, have invented certain new and useful Improvements in Coffee-Mills, of which the following is a specification.

This invention relates to what I shall for convenience term a coffee mill. While the invention is of particular importance when incorporated in an appliance of this character, it is conceivable that it might be otherwise used, for which reason the title given has been adopted. In mills for grinding coffee and other substance, it is the custom to provide a grinding member which in the case of a coffee mill is in the form of a cone. It is necessary that this grinding member or cone should be adjusted to regulate the grade of the product to be ground. There are various ways in use of effecting this adjustment. One of them, which is quite old in the art involves the use of a nut for moving the grinding member toward a complemental surface, and which is backed up by a check nut. This, as I say, is a very old expedient indeed. It is largely in use but possesses certain inherent defects. While the adjustment with this old structure, of the grinding member can be accomplished yet it cannot be very well maintained or at least the nuts due to vibration and other causes become loosened, thus destroying the adjustment and correspondingly affecting the grade of the material being ground. I provide a construction wherein the desired adjustment of the grinding member whether in a coffee mill or otherwise can be made in a rapid and easy manner, but what is most important can be effectively maintained, which is one of the elemental considerations I have in view.

In the drawings accompanying and forming part of the present specification I have shown in detail one convenient form of embodiment of the invention, which I will set forth fully in the following description. I do not restrict myself to this particular disclosure; I may depart therefrom in several respects within the scope of the invention defined by the claims following said description.

Referring to said drawings:

Figure 1 is a side elevation of portion of a grinding mill involving the invention.

Fig. 2 is a central vertical sectional view of the same with the crank arm partly broken away.

Fig. 3 is an inside perspective view of an adjusting nut.

Fig. 4 is a cross section on the line 4—4 of Fig. 1, looking in the direction of the arrow.

Like characters refer to like parts throughout the several views, Fig. 3 being on a larger scale than the other figures.

The mill comprises in its construction a casing as 2, having a hopper as 3 into which the coffee or other material to be ground is placed. In the case of a coffee mill it is usual to carry the coffee in the bean within a canister, supported by the casing as shown for instance in Letters Patent No. 999,684 of August 1, 1911. The invention, however, does not concern this particular point nor the manner in which the casing 2 is mounted. The casing for instance may be supported after the fashion shown in said Letters Patent or in any other desirable manner. Within the casing is mounted the grinding member as 4. This grinding member as shown is of conical form, and it coöperates with the conical surface 5 in the casing. The surface 5 is interrupted by the throat 6 leading from the hopper 3, all of which is quite common in the art, and as to this construction not unlike that shown in said Letters Patent. Rigid with the rotary grinding member or cone 4 or associated with it in any other suitable way, is a shaft 7 which extends outwardly through the casing 3 by way of the boss 8 thereon. In the present case the operating member for the shaft 7 and hence for the grinding member consists of a crank or lever 9 having a suitable driving connection with said shaft for instance the hub of said crank or lever 9 may have a squared opening 10 to receive the correspondingly squared or polygonal intermediate portion 11 of said shaft. The crank or lever 9 as illustrated is furnished with a handle 12 which may consist of a spool mounted at or near the free end thereof and which is grasped to revolve said lever or crank and therefore effect the rotation of the shaft 7 and as a result the grinding member 4 to grind the coffee.

The shaft 7 outwardly beyond the boss 8 is threaded as at 13 to receive the adjusting nut 14 which in the present case not only has a bearing engagement with the hub of the crank or lever 9 but also has a locked relation therewith, as will hereinafter more particularly appear. As shown the hub of the lever or crank 9 is counterbored at 15 to receive the outer end of the boss 8. Said boss interiorly thereof is shown provided between its ends with an annular flange 16 which presents a suitable stop for one end of the coiled spring 17 surrounding the shaft 7, the other end of said spring bearing against the grinding member 4 and tending constantly to retract it or to move its roughened surface away from the correspondingly roughened surface 5.

The nut 14 has a direct locking relation with the crank or lever 9 and although this can be obtained in any desirable manner, it is secured as shown by coöperating teeth 19 and 20 arranged on the nut and crank respectively. As shown the teeth 19 on the nut are disposed in annular order around the opening therein on the inner face of the nut, the outer face of the hub of the nut having a practically similarly arranged and like teeth 20 disposed also in annular order around the opening of the hub. The two sets of teeth are maintained normally in locking relation in some suitable manner as by the spring 21 which as represented bears at its inner end against the flange 16 and at its outer end against the hub of the crank arm 9, said hub having a second counterbore 22 smaller than the counterbore 15 already described and against the bottom of which said spring 21 bears. This spring is of protractile or push type and at all times acts against the hub of the crank arm 9 to force the same outwardly and hence into solid and substantial abutment with the nut 14. It should be noted in passing that this nut is of wing type, although it might be of any other suitable nature. It should also be noted that the two series of teeth have longitudinally bevel surfaces and end or stop faces steeper than the longitudinally extending faces but yet back beveled. The thread 13 of the shaft and that of the coöperating nut may be of any desired type, although both are assumed to be right hand threads.

It will be supposed that it is desired to adjust the grinding member 4 to reduce the grade of the product. In this event, it will be necessary to move the grinding member forward or toward the right for instance in Fig. 2. To accomplish this object the nut 14 will be turned to the right, said nut having a bearing against the hub of the crank arm 9 and will through its feed connection with the shaft 7 draw said shaft outward. To effect forward movement of the grinding member or toward the right in Fig. 2, the nut will be turned to the right. To effect retraction of the grinding member 4, the nut 14 will be turned to the left by reason of which on such action of the nut the spring 17 by acting against the grinding member can bring about the action in question. The back or stop faces of the two series of teeth 19 and 20 as I have noted, are on rather steep bevels, the result being that owing to the solid engagement between the nut and the hub of the crank arm 9 secured as shown by the spring 21 accidental backward movement of the nut will be prevented. Obviously it is a simple matter to turn the nut to the right but backward or left movement will be a trifle harder in order to secure the stopping action to which I have alluded. It is in no sense sufficient to prevent the comparatively free back movement of the nut by manipulation. It is sufficient, however, to prevent accidental movement in such direction.

What I claim is:

1. In the mill of the class described a casing, a grinding member in said casing, the casing having a boss and the grinding member having a shaft extending through said boss, a crank, the hub of which is fitted to the shaft to rotate the same and therefore the grinding member, a spring around the shaft bearing against said hub and also against the grinding member, a nut threaded onto the extended end of the shaft, the nut and adjacent side of the hub having teeth which are longitudinally beveled and which on their ends are beveled on greater angles than the other beveled portions, the two series of teeth coöperating to prevent backward movement of the nut, and a second spring independent of the other spring acting against the hub and the boss to force the hub yieldingly against the nut.

2. In a mill of the class described a casing, a grinding member in the casing, the casing having a boss and the grinding member having a shaft extending through said boss, a spring around the shaft, the boss having an internal annular flange against which one end of the spring bears, the other end of the spring bearing against the grinding member, a crank, the hub of which is fitted to said shaft to rotate the same and therefore, the grinding member, a nut threaded onto the extended end of the shaft, the nut and adjacent side of the hub having teeth which are longitudinally beveled and which on their ends are beveled on greater angles than the other beveled portions of the teeth, the two series of teeth coöperating to prevent backward movement of the nut, and a second spring surrounding the shaft bearing at its inner end against said flange and at its outer end against said hub to force the hub yieldingly against the nut.

In testimony whereof I affix my signature in the presence of two witnesses.

THOMAS J. CONKLIN.

Witnesses:
VICTOR ELI WALKER,
CHAS. F. SCHULTZ.

Copies of this patent may be obtained for five cents each, by addressing the "Commissioner of Patents, Washington, D. C."